United States Patent
Allan

(10) Patent No.: US 9,160,651 B2
(45) Date of Patent: Oct. 13, 2015

(54) METRIC BIASING FOR BANDWIDTH AWARE TIE BREAKING

(71) Applicant: Telefonaktiebolaget L M Ericsson (publ), Stockholm (SE)

(72) Inventor: David Ian Allan, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 119 days.

(21) Appl. No.: 14/101,235

(22) Filed: Dec. 9, 2013

(65) Prior Publication Data

US 2015/0156106 A1 Jun. 4, 2015

Related U.S. Application Data

(63) Continuation-in-part of application No. 14/096,984, filed on Dec. 4, 2013, now abandoned.

(51) Int. Cl.
| | |
|---|---|
| *H04L 12/721* | (2013.01) |
| *H04L 12/707* | (2013.01) |
| *H04L 12/753* | (2013.01) |

(52) U.S. Cl.
CPC .............. *H04L 45/123* (2013.01); *H04L 45/22* (2013.01); *H04L 45/24* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,136,357 | B2 | 11/2006 | Soumiya et al. |
| 7,801,030 | B1 * | 9/2010 | Aggarwal et al. ............. 370/228 |
| 8,553,562 | B2 | 10/2013 | Allan et al. |
| 8,553,584 | B2 | 10/2013 | Allan et al. |
| 2006/0198323 | A1 | 9/2006 | Finn |
| 2007/0002770 | A1 | 1/2007 | van Haalen et al. |
| 2008/0159277 | A1 | 7/2008 | Vobbilisetty et al. |
| 2009/0168768 | A1 | 7/2009 | Chiabaut et al. |
| 2009/0234969 | A1 | 9/2009 | Mohan et al. |
| 2009/0285101 | A1 | 11/2009 | Lu |

(Continued)

FOREIGN PATENT DOCUMENTS

WO   WO2005047923   5/2005

OTHER PUBLICATIONS

"*Virtual Bridged Local Area Networks—Amendment 8: Shortest Path Bridging*", IEEE P802.1aq/D2.5; Jan. 6, 2010, 210 pages.

(Continued)

*Primary Examiner* — Hong Cho
(74) *Attorney, Agent, or Firm* — Nicholson De Vos Webster & Elliott, LLP

(57) ABSTRACT

A method is implemented in a network element for modifying the characteristics of tree construction for use in virtual network connectivity in a network that includes the network element. A virtual network is associated with a set of virtual network attachment points that are mapped to network elements in a topology of the network where the virtual network is individually associated with an equal cost tree (ECT) set. The method generates individual ECT sets to interconnect sets of virtual network attachment points for connectivity establishment and maintenance of the connectivity in the network. The method modifies link metrics across the topology of the network to be used for computing an ECT set to bias a tie-breaking process for selecting between equal cost paths toward either producing minimal cost shortest path multicast trees or maximizing unicast path diversity in the multiple ECT sets that are generated.

22 Claims, 8 Drawing Sheets

(56) References Cited

U.S. PATENT DOCUMENTS

| | | |
|---|---|---|
| 2009/0285208 A1 | 11/2009 | Lu |
| 2009/0290588 A1 | 11/2009 | Kawahigashi |
| 2009/0323687 A1 | 12/2009 | Nishimura |
| 2010/0157821 A1 | 6/2010 | Morris |
| 2010/0232316 A1 | 9/2010 | Takacs |
| 2011/0194404 A1 | 8/2011 | Kluger et al. |
| 2012/0057466 A1 | 3/2012 | Allan |
| 2012/0057603 A1* | 3/2012 | Allan et al. .................. 370/402 |
| 2012/0120803 A1 | 5/2012 | Farkas et al. |
| 2013/0114595 A1* | 5/2013 | Mack-Crane et al. ........ 370/390 |

OTHER PUBLICATIONS

Non-Final Office Action, U.S. Appl. No. 12/877,830, dated Dec. 27, 2012, 8 pages.

Non-Final Office Action, U.S. Appl. No. 12/877,826, dated Dec. 31, 2012, 9 pages.

Notice of Allowance, U.S. Appl. No. 12/877,826, dated Jul. 11, 2013, 12 pages.

Notice of Allowance, U.S. Appl. No. 12/877,830, dated Jul. 26, 2013, 12 pages.

"Media Access Control (MAC) Bridges and Virtual Bridged Local Area Networks", IEEE Std 802.1 aq, Jun. 29 2012; 324 pages.

Allan, David, "802.1aq Shortest Path Bridging Design and Evolution: The Architect's Perspective", Chapter 1: IEEE 802.1 aq in a Nutshell: Antecedents and Technology; Wiley Press 2012, Chapter 1, pp. 1-35.

Allan, David, et al., "Intelligent Load Balancing for Shortest Path Bridging", IEEE Communications Magazine; Jul. 2012; pp. 163-167.

Fedyk, D., et al., "IS-IS Extensions Supporting IEEE 802.1 aq Shortest Path Bridging", Apr. 2012.

Allan, David I., et al., U.S. Appl. No. 14/016,976, filed Sep. 3, 2013, 57 pages.

Allan, David I., et al., U.S. Appl. No. 13/757,532, filed Feb. 1, 2013, 36 pages.

Seaman, Mick, "Agreement Protocol"; 802.1 aq, Revision 2.0, Sep. 7, 2010; 10 pages.

\* cited by examiner

METRIC BIASING FOR BANDWIDTH AWARE TIE BREAKING

CROSS-REFERENCE TO RELATED APPLICATION

The present application is a continuation-in-part of U.S. application Ser. No. 14/096,984, filed Dec. 4. 2013, which is hereby incorporated by reference. Cross-reference is made to U.S. application Ser. No. 14/016,976 filed Sep. 3, 2013, which claims priority to U.S. Provisional Application No. 61/857,985, filed Jul. 24, 2013, which are commonly owned.

FIELD OF THE INVENTION

The embodiments of the invention relate to a method and apparatus for adjusting characteristics of tree construction in a network. Specifically, the embodiments of the invention relate to a method for biasing the link metrics in networks with multiple potential paths between nodes in the network in order to alter the scaling properties of the resultant trees.

BACKGROUND

In network environments paths are calculated between nodes using network topology information. These paths are commonly shortest paths between the nodes and the set of shortest paths from a given node to a set of destination nodes can be considered a shortest path tree. These shortest path trees can be utilized for establishing general routing between nodes or service related routing to interconnect a set of virtual network attachment points for connectivity establishment and maintenance. The determination of the paths can be based on a link based metric. As shortest path trees are added to the network the load associated with each tree can alter the metrics.

Load distribution or load spreading is a method by which breadth of connectivity is more effectively utilized and overall performance is improved in a network. Most automated load distribution and load spreading techniques deployed today, especially those in networks with a distributed control plane, operate with only a very local view, whereby these load distribution and load spreading techniques only consider the number of paths or the next hops to a given destination and do not consider the overall distribution of traffic in the network.

Equal cost multi-path (ECMP) is a common strategy for load spreading of unicast traffic in routed networks that is utilized where the decision as to how to forward a packet to a given destination can resolve to any one of multiple "equal cost" paths, which have been determined to be tied for being the shortest path when running calculations on a topology database. ECMP can be used in conjunction with most unicast routing protocols and nodes equipped with the required supporting data plane hardware, since it relies on a per hop decision that is local to a single router and assumes promiscuous receipt and forwarding of frames combined with a complete forwarding table at every intermediate node. Using ECMP at any given node in a network, the load is divided pseudo-evenly across the set of equal cost next hops. This process is implemented independently at each hop of the network where more than one next hop to a given destination exists.

In many implementations, when the presence of multiple equal cost next hops is encountered, each packet is inspected for a source of entropy such as an Internet Protocol (IP) header and a hash of header information modulo the number of equal cost next hops is used to select the next hop on which to forward the particular packet. For highly aggregated traffic, this method will on average distribute the load evenly in regular topologies (i.e., symmetric topologies) and does offer some improvement in less regular topologies.

ECMP is suitable for networks that have very large communities of interest as the traffic matrix cannot be predicted. However for networks with many small communities of interest and networks that require congruent unicast and multicast forwarding, ECMP is not a good solution, and ECMP solution can demonstrate superior load spreading properties, combined with guaranteed ordered delivery and superior operations, administration and management (OAM) coverage and capability.

In a network where congruent unicast and multicast trees are computed a tie-breaking mechanism is required to tie-break between paths of equal or near equal cost, which is different from dealing with equal cost next hops. Standard 802.1aq defines one such basic tie-breaking mechanism.

SUMMARY

A method is implemented in a network element for modifying the characteristics of tree construction for use in virtual network connectivity in a network that includes the network element. A virtual network is associated with a set of virtual network attachment points that are mapped to network elements in a topology of the network where the virtual network is individually associated with an equal cost tree (ECT) set. The method generates individual ECT sets to interconnect sets of virtual network attachment points for connectivity establishment and maintenance of the connectivity in the network. The method modifies link metrics across the topology of the network to be used for computing an ECT set to bias a tie-breaking process for selecting between equal cost paths toward either producing minimal cost shortest path multicast trees or maximizing unicast path diversity in the multiple ECT sets that are generated. The method encompasses a set of steps including selecting the virtual network that requires connectivity in the network. Shortest path trees are computed to interconnect the set of virtual network attachment points for the virtual network without resolving ties between the shortest path trees. The method determines which nodes of the shortest path trees for the virtual network are candidate nodes for metric biasing using metric propagation. Metric biasing is then implemented using metric propagation based on biasing configuration and finally tie-breaking is performed for all multi-path possibilities in the shortest path trees to produce the set of ECTs for the virtual network and the set of virtual network attachment points.

A network element is disclosed for implementing the method of modifying the characteristics of tree construction for use in virtual network connectivity in a network that includes the network element. A virtual network is associated with a set of virtual network attachment points that are mapped to network elements in a topology of the network where the virtual network is individually associated with an equal cost tree (ECT) set. The implemented method generates individual ECT sets to interconnect sets of virtual network attachment points for connectivity establishment and maintenance of the connectivity in the network. The implemented method modifies link metrics across the topology of the network to be used for computing an ECT set to bias a tie-breaking process for selecting between equal cost paths toward either producing minimal cost shortest path multicast trees or maximizing unicast path diversity in the multiple ECT sets that are generated. The network element includes a database to store the topology of the network and a processor communicatively coupled to the database. The processor is configured to execute a metric biasing module. The metric biasing module is configured to compute shortest path trees to interconnect the set of virtual network attachment points for the virtual network without resolving ties between the shortest path trees, to determine which nodes of the shortest path trees for the virtual network are candidate nodes for metric biasing using metric propagation, to implement metric biasing using metric propagation based on biasing configuration, and to tie-break all multi-path possibilities in the shortest path trees to produce the set of ECTs for the service and the set of virtual network attachment points.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3C is a flowchart of one embodiment of the process for

DETAILED DESCRIPTION

Figure 1:
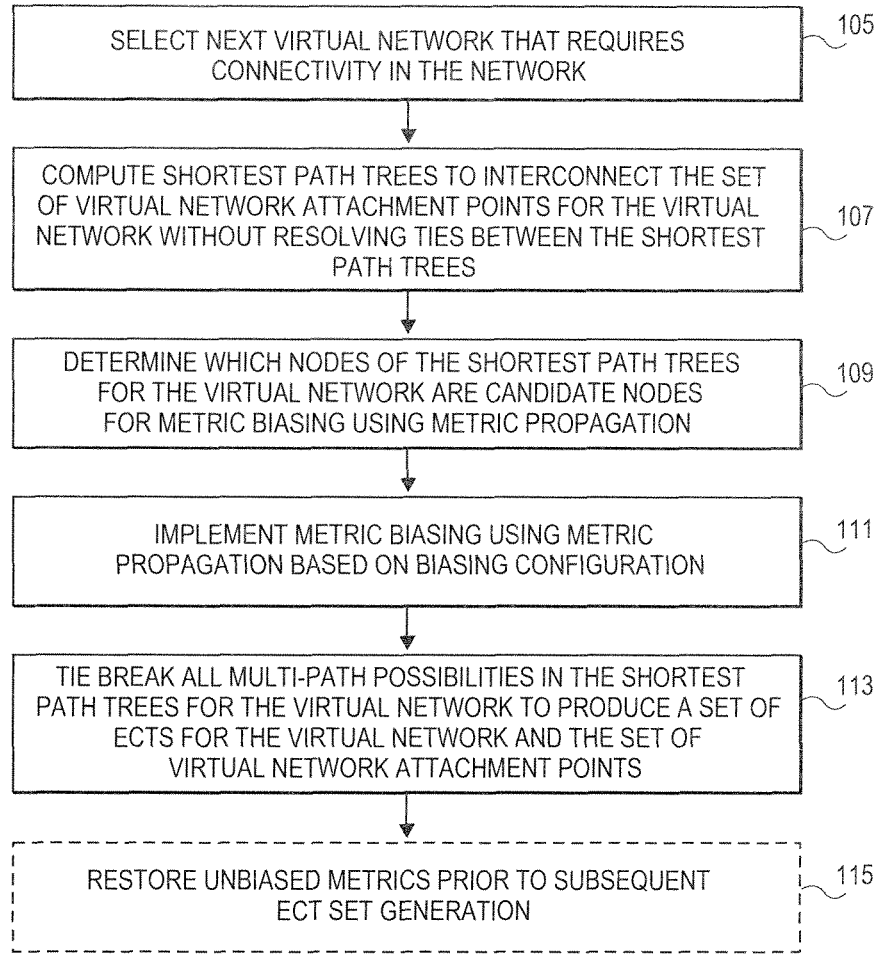
FIG. 1 is a diagram of a process for link metric biasing.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

As used herein, a packet network is designed to be interconnected by a plurality of sets of shortest path trees where each set offers full connectivity between all network elements in the network or between a specific subset of network elements that share virtual network attachment points to common virtual networks.

Connectivity of service instances in the form of virtual networks are supported by the network and individual virtual networks typically have virtual network attachment points on an arbitrary subset of the of the network elements. The connectivity to support these virtual networks can be uniquely instantiated in the network as a per virtual network set of shortest path trees or as dictated by state or as a computational optimization, mapped to an aggregated tree template in the form of a set of shortest path trees in a plurality of aggregated shortest path tree sets.

Ethernet and 802.1aq

The Institute of Electrical and Electronics Engineers (IEEE) 802.1aq standard for shortest path bridging (SPB) is used to construct full mesh shortest path connectivity in an Ethernet network architecture. SPB consolidates what normally is a number of control protocols into a single link state routing system supported by the intermediate system to intermediate system (IS-IS) protocol. This system is used for the computation of integrated and congruent unicast and multicast forwarding to construct Ethernet LAN connectivity.

802.1aq is an exemplar of a networking technology that can use edge based load assignment onto one of any number of set of trees and supports multiple connectivity service instances (i.e., virtual networks). As such the network can be meshed multiple times.

Ethernet network architectures including those supporting 802.1aq do not support per hop multi-path forwarding. This lack of support is a consequence of the need for congruence between unicast and multicast traffic and because multicast is not compatible with ECMP. Instead, multi-path solutions are implemented by instantiating a separate VLAN for each path permutation and assigning to each of the VLANs a portion of the load at the ingress to the Ethernet network. In the current 802.1aq specification, path permutations are generated via shortest path computation combined with the algorithmic manipulation of the node identifiers which are used for tie-breaking between the equal cost paths. The standardized algorithmic manipulation of node identifiers produces pseudo-random path selection and requires a significant dilation factor (needed to create more virtual paths than there are actual physical paths through the network) in order to even out the link utilization. Overall performance of the current multi-path solution is similar to ECMP.

MPLS

Multiprotocol label switching (MPLS) is a combination of a data plane and control plane technology utilized to forward traffic over a network. MPLS uses per hop labels that are assigned to a stream of traffic to forward the traffic across the network using label lookup and translation (referred to as "swapping"). Each node of the network supports MPLS by reviewing incoming traffic received over the network and forwarding that traffic based on its label, the label is typically translated or "swapped" at each hop.

MPLS networks can improve the distribution of routed traffic in the network using per hop ECMP to distribute or spread a load across equal cost paths. In MPLS networks, a label switch path (LSP) is set up to each next hop for each equal cost path by every node in the network. The forwarding path for a given destination in the network is calculated using a shortest path first (SPF) algorithm at each node in the network, mapped to the local label bindings in the node, and the resultant connectivity appears as a multi-point to multi-point mesh. Individual nodes when presented with traffic destined for multiple equal costs paths utilize payload information as part of the path selection mechanism in order to maximize the evenness of flow distribution across the set of paths. The establishment of the multi-point to multi-point LSP is automated.

The label distribution protocol (LDP) or similar protocol is used to overprovision a complete set of label bindings for all possible forwarding equivalence classes in the network, and then each label switch router (LSR) independently computes the set of next hops for each forwarding equivalence class and selects which label bindings it will actually use at any given moment. MPLS does not have a dataplane construct analogous to the Ethernet VLAN. However, as described in U.S. patent application Ser. No. 12/877,826, this notion can be encoded in the control plane such that MPLS can also have a mode of operation analogous to multi-tree instead of ECMP.

Basic Load Distribution Process Tie-Breaking

The basic load distribution process for the creation of forwarding trees standardized in 802.1aq and applicable to MPLS utilizes a tie-breaking process with distinct properties such that given a set of equal cost paths between any two points can be resolved to a single symmetric path regardless of the direction of computing, order of computing or examination of any subset of the path, a property described as "any portion of the shortest path is also the shortest path." Or stated another way, where a tie occurs along any portion of the shortest path, those nodes will resolve the tie for the subset of the path with the same choice as all nodes examining any other arbitrary subset of the path, the result being a minimum cost shortest path tree. This is referred to herein as the "common algorithm tie-breaking" process. Algebraic manipulation of the inputs into the tie breaking process are used to generate topological variability between the individual sets of trees so computed. The common algorithm tie-breaking process has desirable properties in that when applied to a distributed control plane, all nodes generate an identical solution to the problem of generating shortest path trees. The process is required to ultimately generate a unique result, and therefore used node identifiers (IDs) as the primary input to generating a unique solution. This results in pseudo random path placement. If the process is modified to include metrics, it becomes useful both in a distributed context (as all computing nodes will produce a common result), and in a centralized context as it implements a clear and useful criteria for path selection and network planning, in this case more optimum placement of load to achieve superior network utilization.

In one embodiment of the algorithm, a new VPN is to be added to a network that is not dependent on the central controller for resiliency. A central network management/network controller can compute specific placement of the set of trees required to instantiate the necessary connectivity or can preselect an aggregated tree set to assign the service to.

In another application of the algorithm, it is applied to a distributed routing system or centralized controller (applying SDN like techniques) that will compute a set of trees to converge the network in such a fashion that the network becomes resilient to topology changes and changes in the traffic matrix. These may be at the granularity of set of trees per individual virtual network, or aggregated trees where each set of trees can act as an overall connectivity template for some subset of the virtual networks supported by the network. Individual virtual network connectivity can be uniquely instantiated, but the connectivity components themselves are a perfect subset of the template and congruent with it. In order to guarantee a common result, the order of computation and placement of the set of trees is preconfigured such that a distributed system will again see each computing node generate the same result.

In the basic convergence process, some network event will trigger a recomputation of the forwarding tables in the network in order to reconverge the network. This may be in response to a failure of a node or link, addition of components to the network, or some modification to the set of virtual networks supported by the network.

Overview of Link Metric Biasing

The embodiments of the present invention provide a system, network and method for avoiding the disadvantages of the prior art including an inability to generate symmetrically congruent sets of shortest path trees that are based on link metrics that have been biased to produce minimal cost shortest path multicast trees or maximizing unicast path diversity in the sets of trees generated. The process can be applied generally to establishing connectivity for a service as part of the ECT set generation process. In specific embodiments, the process can be applied to load distribution processes, particularly load distribution processes of 802.1aq although the embodiments can also be applied to load spreading or tree generation processes in other types of networks. However, the embodiments are not limited to an 802.1aq implementation and the description of the 802.1aq implementation is provided by way of example and not limitation. Therefore the terms "tree set" and "equal cost tree (ECT) set" may be used interchangeably.

A network is configured to use a specified number of ECT sets for forwarding, each of which aggregates the connectivity of one or more virtual networks, the order in which to compute them and the algorithm to use for each such that both distributed computation of the ECT sets will generate a common result and repeated computation of the ECTs across a variety of network conditions will maximize overall stability of the network by minimizing the deltas in forwarding across topology and service changes. Individual virtual networks are assigned to one of the plurality of ECT sets. The criteria by which such services are assigned to which ECT set is out of the scope of this invention. During the calculation of each ECT and prior to any metric based tie breaking, link metrics for the network can be examined and biased toward either producing minimum cost multicast trees or producing ECT sets with maximum unicast diversity. Other outcomes may be possible via other variations of metric biasing and are not excluded from the scope of the invention. The link metric can be a link available bandwidth or similar link metric. The process computes the set of possible shortest path trees with no tie breaking resolution for set of virtual network attachment points that are load sources in the current ECT set, tracks the pairwise connectivity on all links, and then prunes where there are no attachment points in common at either end. Anywhere in the set of shortest path nodes that there is a "non-load source node" with a single outgoing link that is exclusively used to reach a virtual network attachment point or set of virtual network attachment points in the current ECT set the process then examines the incoming links of that 'candidate' node. If the candidate node is purely 2 connected (i.e., it has a single incoming and outgoing link for a given ECT) for the set of paths to the virtual network attachment points reachable via the outgoing link, then the link metrics of the incoming links of the node are not altered as they are presumed to have no effect on the desired biasing behavior and would add a second order of complexity in the algorithm when considering candidate nodes. However, if there are incoming links with unequal subsets of the paths to the outgoing set of virtual network attachment points, where subset of the outgoing set of destination relates to the number of virtual network attachment points on each branch of the outgoing link, then the link metrics of the incoming links can be modified. If the goal or configuration is to bias the ECT sets towards minimum cost multicast trees, then the process determines the incoming link or links with the smallest subset of the set of destinations for the outgoing link, and if the outgoing link metric is less desirable than that of the incoming link, then the process sets the incoming link with the outgoing link metric value.

However, if the goal or configuration is to bias the ECT set towards the maximum unicast diversity, the process determines the incoming link or links with the largest subset of the set of destinations for the outgoing link, and if the outgoing link metric is less desirable than that of the incoming link or links, then the process sets the metric of the incoming link with the largest subset to the outgoing link metric value. When all metric modification is complete, then the process performs tie breaking using either the sum of metrics of each path or the lexicographically ordered and ranked link metrics for each path to determine actual trees for the ECT set, and this does not produce a unique result, reverting to the common tie breaker for the subset established via metric based tie-breaking.

To maintain independence of the order of computation, metric modification is normally limited to one hop unless additional procedures are defined to handle the case where a concatenated chain of more than one candidate node exists where adjacent nodes are all candidates for propagation. Limiting metric modification to one hop means that only unbiased metric values are propagated.

The actual effect of metric propagation is specific to the ECT set, and upon completion of computation of that ECT set, the link metrics are restored to their value prior to the biasing step (Block 115).

Example ECT set construction Embodiments

FIG. 1 is a flowchart of one embodiment of the link metric biasing process. There are two polar opposites in metric biasing one type of biasing will tend to produce minimum cost multicast trees, which are defined as the smallest set of forwarding hops for multicast while still being a shortest path tree, as well as a minimal multicast state. The other type of biasing will tend to produce maximum unicast diversity, which depending on the mix of multicast and unicast, may be a preferred configuration.

If there is a distinct output link exclusively used for a virtual network attachment point destination or set of virtual network attachment points associated with the ECT set and ingress links that have distinct and diverse subsets of the possible pairwise paths to that set of attachment points, it is possible to propagate a value based on the output link metric to the incoming link to make it reasonably aligned with the actual downstream link metric (e.g., the available bandwidth) as the metric propagation would not artificially create a bottleneck, or unduly inflate the metric. In this case the resulting tree (after tie breaking) will result in the decision node being logically two connected in the ECT set being constructed. This biasing affects metric based tie-breaking in path selection and if artificial bottlenecks, or metric inflation resulted on a particular path choice, there would be a higher probability that a hop with an inferior metric will be used, which does imply a higher probability of queuing delay, so it is important that the metric biasing logically reflects the actual metrics used in the network.

As mentioned, the link metric biasing can have at least one of two possibilities. If the metric of the largest subset of destinations relative to a particular node in a set of shortest paths is made less desirable then it reduces the likelihood that the most richly connected path will be selected as part of the ECT. If the available bandwidth of the smallest subset of destinations relative to a particular node in a set of shortest paths is made less desirable, then it reduces the likelihood that the least richly connected path is used. If there is a spectrum of subsets, e.g. most richly connected nodes, least richly connected nodes and intermediate connected nodes, biasing the intermediate nodes so the result tends towards the optimizations represented by the extremes affects the characteristics of the resulting ECT sets.

The process has advantages over the prior art in providing configuration options depending on network operator preferences or requirements. The process can produce minimum cost multicast trees that minimizes both multicast bandwidth consumption and multicast state in the network. The alternative is that the process produces maximum unicast diversity to increase load spreading of unicast in the network at the expense of multicast efficiency. These options were not readily available to network operators without this process and could be applied individually to ECT set generation such that a mix of behaviors was available in a given network.

The network element is one of a plurality of network elements in the network each of which implement a common algorithm tie-breaking process as part of a computation used to produce shortest path trees. The topology of the network includes a plurality of network elements and links between the network elements. The network element includes a database to store the topology of the network amongst other elements including a processor to execute a biasing module that implements the process.

A set of virtual network attachment points for one or more virtual networks is mapped to network elements in the topology and associated with an equal cost tree (ECT) set. The process generates individual ECT sets to interconnect sets of virtual network attachment points for connectivity establishment and maintenance of the connectivity in the network, on a per virtual network basis. The process relates to a path selection process where the process modifies link metrics used for computing the resulting forwarding topology for an ECT set to bias the tie breaking process for selecting between equal cost paths. The biasing moves the path selection process toward either producing minimal cost shortest path multicast trees or maximizing unicast path diversity in the multiple tree sets that are generated.

As illustrated, the process can be applied to biasing relative to a single virtual network, or in an alternate embodiment can be an iterative process (not shown) applied to individual virtual networks or sets of virtual networks requiring network connectivity. The technique may be applied independent of the prior state of the placing of tress in the network, or may constitute the exclusive mechanism for determining tree placement. In one embodiment, the method may generate an initial set of ECT based on the network topology for a first virtual network. Because there are no prior ECTs affecting link metrics it is not necessary to account for any impact of link metrics in generating the initial ECT set. In other embodiments, the method does not generate any initial set of ECTs based on network topology. The process can begin with or continue with generating an ECT set for each additional virtual network that is to be provisioned.

When the technique is applied to tree generation for a single virtual network, it is also possible to utilize the technique of modifying the metrics of component links of a selected tree to ensure any of those links is selected only as a last resort prior to repeating the tie-breaking step to produce tree pairs of maximum physical diversity, which would be useful for centralized system that delegated resilience to the dataplane, and would allow for open ended addition of virtual networks individually planned without concerns about computational complexity (as would be the case for a distributed routing system that used the technique).

In the alternate embodiment, where there are multiple virtual networks to be provisioned the process can check whether all ECT sets have been computed for all virtual networks. If all of the needed ECT sets have been generated, then the process completes. If all of the needed ECT sets have not been generated then the process proceeds by selecting a next virtual network or set of virtual networks for which an ECT set is to be generated (Block 105).

For each virtual network requiring connectivity in the network the process computes all potential shortest path trees required to interconnect the set of virtual network attachment points for the virtual network without resolving ties between the shortest path trees (Block 107). The criteria for selecting the potential set may permit paths that are not exactly equal by some criteria to be included in the set. The shortest path trees can be calculated using any routing algorithm such as Dijkstra's algorithm or a similar algorithm. Each of the nodes in the shortest path trees is traversed and examined to determine which nodes of the shortest path trees for the service have sets of links that make them candidate nodes for metric biasing adjustment using metric propagation (Block 109).

The criteria for identifying the links that are candidates for metric adjustment for the current ECT set can involve determining whether a given node is a non-load source node that is it is not a virtual network attachment point or similar producer of consumer of the data, i.e., the load for the current ECT set. If the node is a non-load source node then it is determined whether it has a single outgoing link that is exclusively used to reach a virtual network attachment point or set of virtual network attachment points such that no other link is a potential tie breaking result for any of the virtual network attachment points in the set. Where there is a single outgoing link exclusively used to reach a set of attachment points in the current ECT set and only the paths to that set of attachment points use that link in the current ECT set then a 'candidate node' has been identified and the incoming links of the candidate node are examined (Block 109).

If the candidate node is connected symmetrically for a given set of virtual network attachment points in the ECT set to two other nodes on the outgoing links, then no link metric biasing is performed. However, if the node is more than two connected for the set of virtual networks being considered, and there is asymmetry in sets of paths arriving in the incoming links for a set of outgoing virtual network attachment point on the single outgoing link, then the incoming links have unequal subsets of the paths transiting the outgoing link and link metric biasing can be implemented using a metric propagation that is dependent on the type of biasing that has been configured either to promote minimum cost multicast or to promote maximum diversity unicast trees (Block 111).

In one example embodiment, the link metric biasing is implemented by setting the metrics for an incoming link with the smallest subset of the outgoing paths to the outgoing link metric, only when the outgoing metric is less desirable than the incoming link metric. This link metric propagation biases the tie breaking for the ECT set towards minimum cost multicast trees.

The link metric biasing can also be implemented by setting an incoming link metric of the link with the largest subset of paths transiting the outgoing link to the outgoing link metric, only when outgoing link metric is less desirable than the incoming link metric. The link metric propagation in this case biases the tie breaking of paths in the ECT set towards maximum unicast diversity.

After the link metric biasing has been applied, then the path selection process performs a primary tie-breaking for all multi-path possibilities in the shortest path trees using a primary tiebreaker (e.g., of a lexicographically sorted and ranked list of the metrics) for the set of links traversed by the set of qualified paths and a secondary tiebreaker used to resolve any outstanding ties (Block 113). In another embodiment, the primary tiebreaker is the sum of the link metrics for each shortest path.

If the primary tie-breaker fails to result in a unique shortest path, then the common algorithm is applied to the set of paths that are tied at the end of the primary tie-breaking step. Therefore this path selection is simply guaranteed to produce a unique single path choice for the set of shortest paths to produce a set of ECTs for the set of service attachment points.

Link metrics can be any type of measurement related to link performance including link available bandwidth, which can be defined as the net remaining bandwidth after all previous ECT placement has occurred. Other types of link metrics can involve bandwidth measurement, latency measurement, and similar link properties and conditions.

Figure 2A:
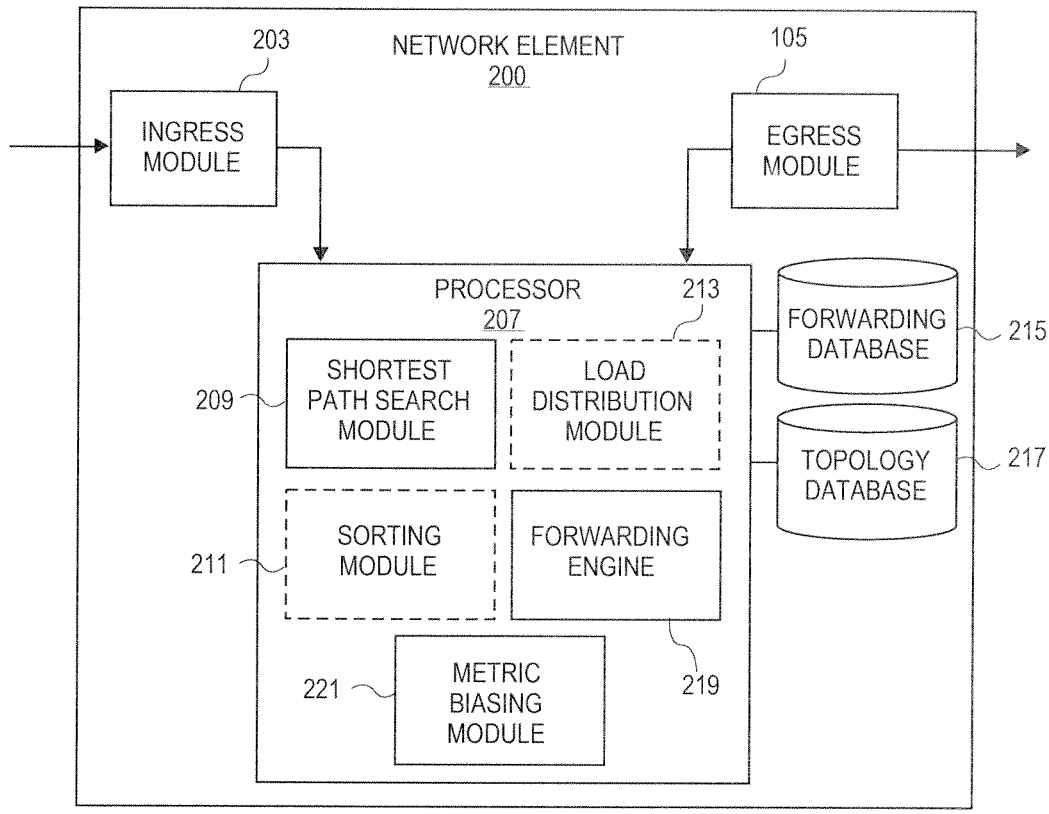
FIG. 2A is a diagram of one embodiment of a network element implementing a link metric biasing process as described herein below.

FIG. 2A is a diagram of one embodiment of a network element implementing the link metric biasing process optionally in combination with bandwidth aware path selection for automated traffic engineering. This link metric biasing process is based upon the use of link metrics as feedback into the path selection mechanism. In one embodiment, the network element 200 can include a forwarding database 215, a topology database 217, an ingress module 203, an egress module 205, a forwarding engine 219, load distribution module 213 (optional), sorting module 211 (optional), shortest path search module 209 and a processor 207. In other embodiments, such as an MPLS implementation other components such as a label information base, LDP module, MPLS management module and similar components can be implemented by the network element 200. The example embodiment of the network element can be an 802.1aq Ethernet bridge, however, one skilled in the art would understand that the principles, features and structures can be applied to other architectures such as a network element implementing MPLS.

The ingress module 203 can handle the processing of data packets being received by the network element 200 at the physical link and data link level. In one embodiment, this includes identifying IS-IS traffic destined for the processor 207. The egress module 205 handles the processing of data packets being transmitted by the network element 200 at the physical link and data link level. The control processor 207 can execute the forwarding engine 219, the shortest path search module 209, load distribution module 213 and sorting module 211.

The forwarding engine 219 handles the forwarding and higher level processing of the data traffic. The forwarding database 215 includes a forwarding table and forwarding entries that define the manner in which data packets are to be forwarded. Forwarding entries relate addresses to network interfaces of the network element 200. This information can be utilized by the forwarding engine 219 to determine how a data packet is to be handled, i.e., which network interface the data packet should be forward unto.

The optional load distribution module 213 creates forwarding entries that implement the load distribution as described herein below in the example embodiments described in relation to FIGS. 3A-3C. The metric biasing module 221 executes the process described herein above in relation to the metric biasing process of FIG. 1. Similarly, the metric biasing module 221 can implement a process specific to incorporation into path selection and load distribution as described in relation to FIG. 3C.

Generally, the metric biasing module can select a virtual network that requires connectivity in the network, compute a set of shortest path trees to interconnect the set of attachment points for the virtual network without resolving ties between the shortest path trees, determine which nodes of the shortest path trees for the virtual network are candidate nodes for metric biasing using metric propagation, implement metric biasing using metric propagation based on biasing configuration, and tie-break all multi-path possibilities in the shortest path trees to produce the set of ECTs for the virtual network and the set of attachment points. However, the tie-breaking step can also be performed by other components such as the load distribution module 213 and the shortest path computation can be performed by a separate shortest path search module 209.

The topology database 217 stores a network model or similar representation of the topology of the network with which the network element 200 is connected. The topology database 217 includes identifiers for each of the nodes in the network as well as information on each of the links between the nodes. In one embodiment, the nodes in the network are each network elements (e.g., Ethernet bridges or similar devices) and the links between the network elements can be any communication medium (e.g., Ethernet links). The nodes (i.e., each network element) can be identified with unique node identifiers and the links with node-identifier pairs. One skilled in the art would understand that this network model representation is provided by way of example and that other representations of the network topology can be utilized with the load distribution method and system.

A shortest path search module 209 is a component of the processor 207 or a module executed by the processor 207. The shortest path search module 209 traverses the topology database 217 to determine a set of candidate paths between any two nodes in the network topology. If there are multiple paths meeting the required criteria, for example, having an equal distance or cost (i.e., lowest e2e metrics) in the network between two nodes, then this path set can be provided to the sorting module 211 and/or load distribution module 213 to determine which to utilize. The shortest path search module 209 can be used to determine the sets of candidate paths between all node pairs in the network topology or the shortest path search module 209 may restrict the search to all nodes pairs in the network topology that contribute load, e.g., for a particular service that can be identified by an I-SID, both the all nodes and the all load sourcing or sinking node embodiments are referred to herein as an "all pairs" computation.

The shortest path search module 209 provides a set of candidate paths for each node pair considered to the metric biasing module 221 and the metric biasing module 221 examines the links of these paths and modifies the link metric values that are associated with each of the links to bias path selection as described herein above.

On or after the first pass, and prior to each subsequent pass of ECT set generation, the metric biasing module 221 evaluates the link metrics for each link in the network topology. In one example embodiment, the link metric is the link available bandwidth. The link available bandwidth value can be a representation of the link bandwidth net of the cumulative bandwidth utilization resulting from all previously placed ECT sets in the network. This relies on bandwidth information for each service (I-SID) associated attachment points to the network. Where the embodiment is a distributed routing system, the interior gateway protocol information exchanged can be augmented to provide a traffic descriptor for each service (I-SID and ISIS in the case of 802.1aq) attachment point to the network where the traffic descriptor was populated by management, (although in a degenerate case for at least 892.1aq, a default value could be used without requiring changes to add a descriptor to IS-IS), or as an alternative to avoid configuration steps, a descriptor using values derived from the bandwidth of the attachment link could also be used, yet other variations of how this information is obtained are possible. In one example embodiment, a Metro Ethernet Forum (MEF) 10.2 type of descriptor could be utilized to include a committed information rate ($CIR_{I-SID}$) and burst rate or excess information rate ($EIR_{I-SID}$). Further in the example embodiment, the value is adjusted to represent the community of interest associated with the I-SID, with this information, a number of pairwise service (I-SID) attachment points is determined that use each link ($n_{link}$). The total number of attachment points for each I-SID ($n_{I-SID}$) is determined. A division factor can then be determined to apply to the I-SID traffic descriptors on the assumption that the traffic matrix was evenly divided between the attachment points on average or as is well understood to those skilled in the art, this could be modified to reflect an oversubscription or dilation factor for how traffic is distributed in a multipoint service construct.

A simple but not the exclusive or best form of this computation is presented where for a given ECT set and for each node pair that includes a link on an assigned path between them, the set of I-SIDs in common assigned to that ECT set is determined. For each I-SID attachment point pair in the set, the bandwidth descriptor is adjusted by being divided by the number of I-SID attachment points minus one, and the cumulative results for all I-SIDs in common is summed. The resulting number represents the expected bandwidth consumption on that link for all I-SIDs in that ECT set.

This process can be expressed as pseudocode as follows:
For all links in a network
    Link_utilization[link]=0
    For all ECT sets computed so far
        For all nodes pairs in network (or For all node pairs associated with a load or at least one service, i.e., associated with at least one I-SID)
            If link on shortest path between node pair in this ECT set
                For all I-SIDs assigned to this ECT set that the node pair have in common
            Link_utilization[link]+=I-SID bandwidth value/(# of endpoints in I-SID-1) and modified by any dilation or oversubscription factors
        When completed, Link available bandwidth [link]=link capacity[link]−link_utilization[link]

The link bandwidth availability value is calculated and recorded for each link. These link bandwidth availability values are utilized when performing bandwidth aware tie breaking for path selection to generate a path available bandwidth value that in turn is used to bias the rankings of the paths for subsequent ECT set generation steps where the initial selection criteria is either the ranked list of lexicographically sorted link bandwidth availability values, and where this results in a tie for both highest available e2e bandwidth and lowest e2e sum of metrics the common algorithm tie-breaking process is used as a subsequent tie breaker. The combination of the two algorithms will produce a unique path selection where any part of the selected path is also congruent with the selected path, a key property for planar forwarding tree generation.

The optional sorting module 211 is a component of the processor 207 or a module executed by the processor 207. The sorting module 211 assists the load distribution module 213 by performing an initial ranking of the loaded set of equal cost trees based on the path available bandwidth values in the second pass and in subsequent passes.

In the example embodiments involving bandwidth aware path selection, the concept of "equal cost path" is modified to become "path qualification," as the sum of metrics for each path becomes only one input to selecting a set of paths to which bandwidth aware path selection may be applied. The objective of "path qualification" is to ensure that a useful and bounded set of paths between the points of interest be considered, and the same set or subset when path fragments also embody ties, will be chosen by any nodes computing paths in the network regardless of the direction of computation. An exemplar path qualification algorithm that would produce such a useful candidate set would be to determine the longest path in terms of hops that had the lowest metric or was tied for lowest metric, and then select all paths of an equal or a lower hop count between the source and destination.

For each node pair with multiple candidate paths, the sorting module 211 generates a ranking of each of these candidate paths based on path available bandwidth values and the load distribution module 213 selects at least one path from this ranking. The load distribution module 213 is a component of the processor 207 or a module executed by the control processor 207. In this load distribution example, the selection and tie breaking are influenced by the metric biasing, which modifies in this case the path available bandwidth.

In one embodiment, when computing the first ECT set (which in this embodiment is topology aware), equal cost paths are determined as having equivalence in both the lowest number of hops and the lowest metric. The lowest number of hops needs to be equal for tie-breaking to produce ECTs with the appropriate properties when all aspects of this improved algorithm and the common algorithm are considered. However, for computing bandwidth aware ECT sets, the equivalence of lowest metric requirement can be eliminated and path selection can be performed across the qualified set of paths that may be of unequal length or of less desirable metric than the shortest path. A given path may have a less desirable metric, but actually have more available bandwidth that a path of a more desirable metric as an artifact of a topology aware computation or any previously placed ECT sets.

This process can be repeated through any number of passes or iterations where the metric values are updated to be a cumulative indication of the requirements of the set of service or virtual network attachment point pair paths that transits it vs. the actual physical link capacity. The path available bandwidth values are also updated in line with the changes to the link utilization values. The number of passes or iterations is designated by an administrator typically at network commissioning time, is configured network wide and the choice is a compromise between efficiency, state and target convergence times for the network.

In other embodiments, the network element illustrated in FIG. 2A can be implemented on a set of virtual machines for providing separate execution environments for the independent operation of the functions of the modules described above and other functions implemented for other execution environments. Any number of virtual machines can implement the network element. Any set of the executing virtual machines can implement the functions and modules described above. In one embodiment, the set of virtual machines as well as any set of operating systems can be managed by a hypervisor. The hypervisor manages resources of the network element between the virtual machines and operating systems including the booting and terminating of each of the virtual machines and operating systems.

Figure 2B:
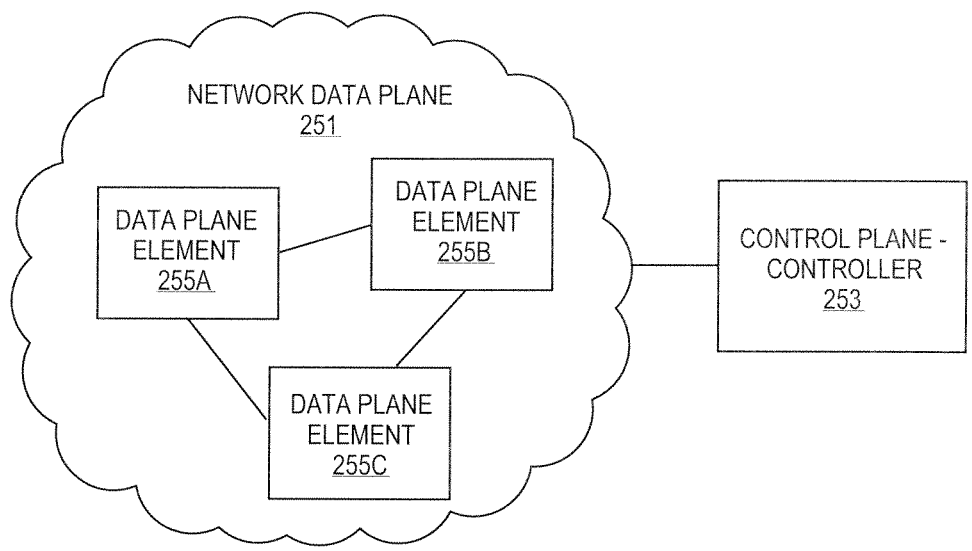
FIG. 2B is a diagram of another embodiment implementing the link metric biasing process.

In other embodiments, the functions for implementing metric biasing are executed by a control plane or processor that is remote from a dataplane or forwarding processor. The example illustration and architecture of FIG. 2A can be adapted to such a split architecture as illustrated in FIG. 2B. The metric biasing module 221 (as well as other modules including the shortest path search module 209, load distribution module 213 and sorting module 211) can be executed by a control processor of a controller 253 that is remote from the network elements implementing the forwarding engine in a set of data plane elements 255A-C. The controller can be in communication with the dataplane 251 via a flow control protocol, such as the OpenFlow protocol. The functions of the metric biasing module 221, shortest path search module 209, load distribution module 213 and sorting module 211 can implement the same functionality as described in the illustrated architecture of FIG. 2.

Figure 3A:
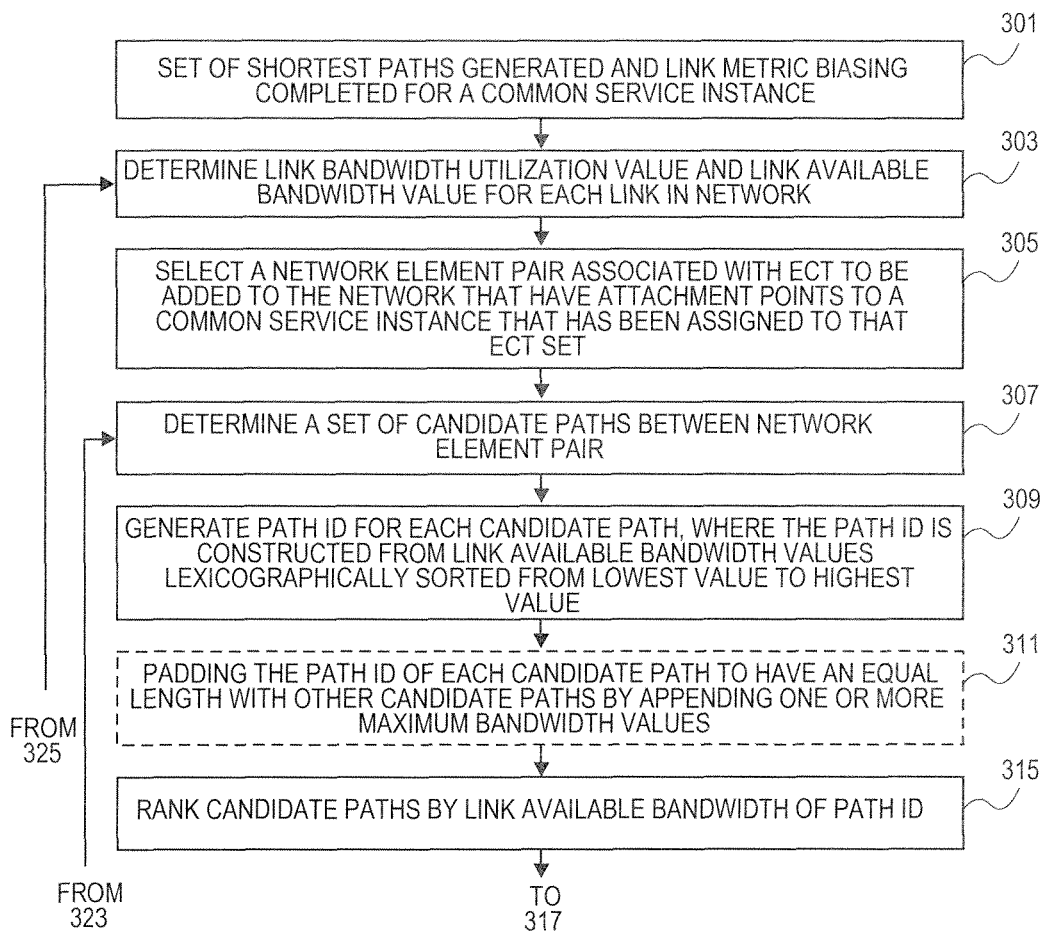
FIG. 3A is a flowchart of one embodiment of an example load distribution process including link metric biasing.
Figure 3A:
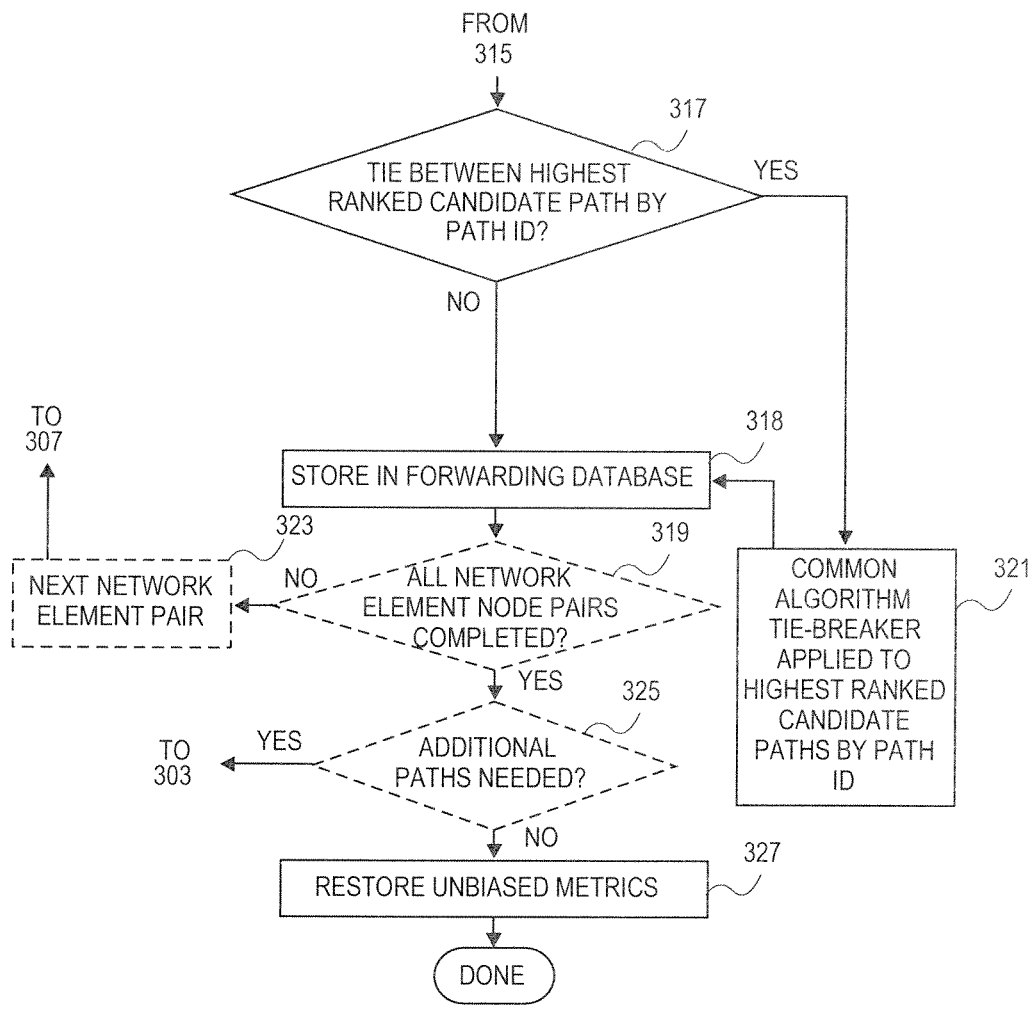

FIG. 3A is a flowchart of one example embodiment of a process for load distribution enabling automated traffic engineering based upon the use of link bandwidth utilization as feedback into the path selection mechanism for qualified paths with further modification to bias the link available bandwidth utilization. In one embodiment, the process can be run at the initiation of a network element, for example an Ethernet bridge, upon notification of a change in topology to the network connected to that network element, at defined intervals or at similar events or times. A topology database is maintained at each network element in a network as a separate process from the load distribution process and is assumed to be a current representation of the true topology of the network. The example flowchart discusses the process in terms of network elements and network element pairs, a network element is a node in a network and the term node is used herein above in describing the process, principles and structures and would be understood by those skilled in the art to encompass network elements and similar devices.

The illustrated load distribution process can be executed in conjunction with the general link metric biasing process described in regard to FIG. 1. The load distribution process implements an embodiment of the tie-breaking of multipath possibilities for the shortest path trees (Block 113). As is described further herein below with regard to FIG. 3C, the link metric biasing process in this embodiment is implemented in FIG. 1 with regard to the identification of candidate nodes and the implementation of the biasing as described herein below with respect to FIG. 3C. For load distribution of a given set of ECTs the link metric biasing is first performed before the path selection is completed as described with relation to this example embodiment. In this example embodiment, the virtual networks of FIG. 1 are common service instances.

After the set of shortest paths is generated and the link metric biasing completes (Block 301), the link available bandwidth value for each link is calculated either as a consequence of or after the update of the forwarding database for all network element pairs has completed and after the link metric biasing has completed (Block 303). As an intermediate step the link bandwidth utilization value is calculated for each link in the network. The link bandwidth utilization value provides an indication of the level of usage based on the CIR and EIR of the I-SID attachment points attached to the network and enables the indirect identification of potential bottlenecks in the network that should be avoided if additional paths are to be formed. The link available bandwidth value is the difference between the physical capacity of a link and the link bandwidth utilization value. The link available bandwidth value can be used for bandwidth aware path selection.

Figure 3B:
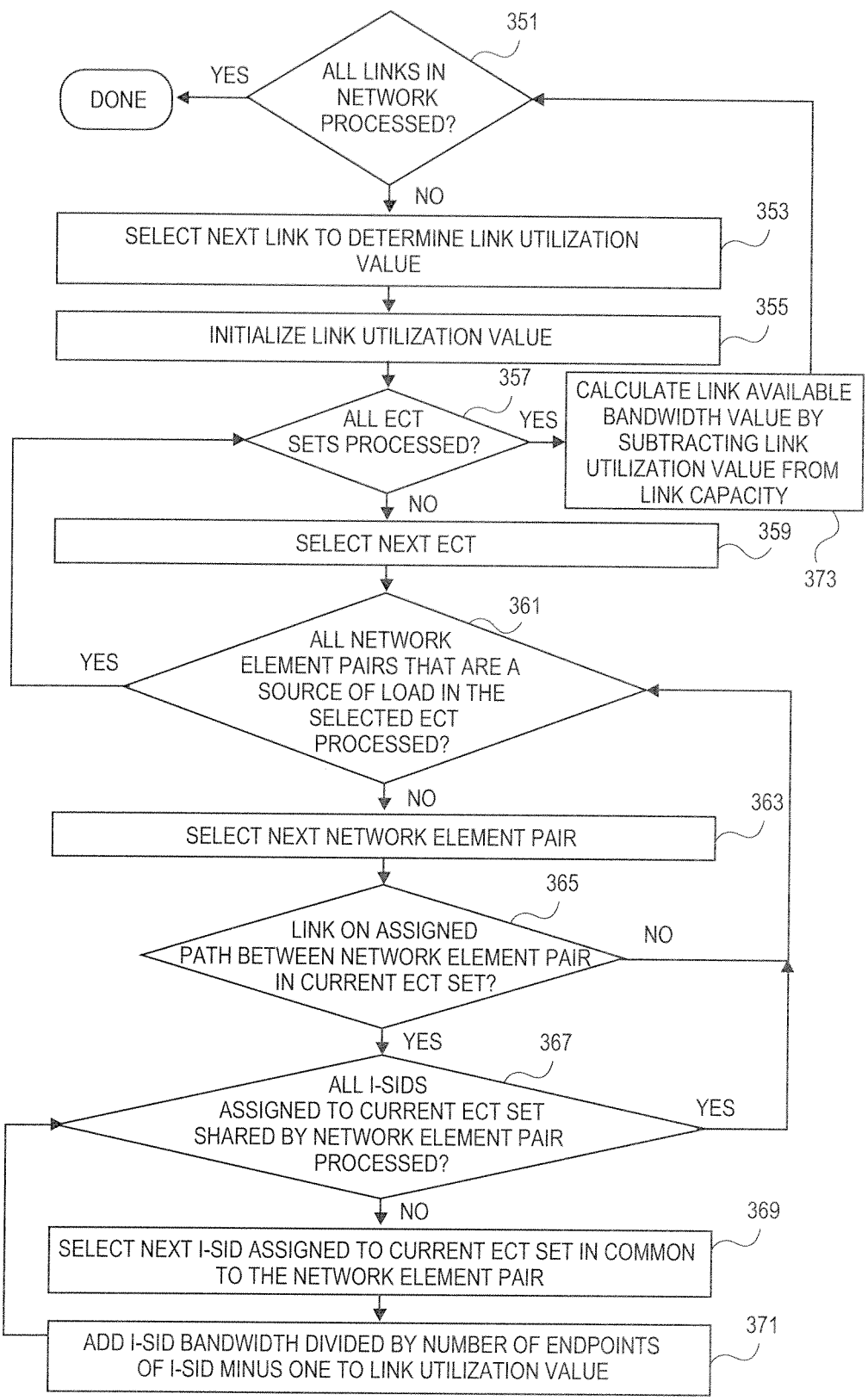
FIG. 3B is a flow chart of one embodiment of the process for determining the link bandwidth utilization values for the example load distribution process including the link metric biasing.

FIG. 3B is a flow chart of one embodiment of the process for determining the link bandwidth utilization values. In one embodiment, the process iterates through each link in the network to determine the link utilization value for each link based on the ECTs determined up to this point in time as modified by the link metric biasing process. A check is made to determine whether all of the links in the network have been processed (Block 351). Once all of the links have been processed and their associated link available bandwidth values determined, the process can exit and return to the overall load balancing and path selection process described starting at step 305 in FIG. 3A.

If all of the links have not been processed, then the next link is selected for the determination of its link utilization value as well as its link available bandwidth (Block 353). The links can be processed in any order, serially, in parallel or in any similar method. As each link is processed a starting link utilization value is initialized (e.g., by setting the link utilization value to zero) (Block 355).

A check is then made whether all of the ECT sets computed so far have been processed relative to this link (Block 357). In other words, have all of the paths that have already been determined in the earlier pass using the common algorithm or prior passes of this process been processed for their effect on the current bandwidth aware computation. If all of the ECTs have been processed relative to the selected link, then the process continues on to the next link by returning to the processed link check (Block 351) after a link available bandwidth calculation discussed further below (Block 373). Where all of the ECT sets have not been processed the next ECT is selected.

A check is made whether all of the network element pairs (i.e., the node pairs) that have a load or are associated with a virtual network (e.g., an I-SID) have been processed relative to the current ECT and link (Block 361). If all of the relevant network element pairs have been processed, then the process continues on the next ECT by returning to the processed ECT check (Block 357). If all of the relevant network element pairs have not been processed, then the next network element pair is selected. The relevant network element pairs can be processed in any order, serially, in parallel or in any similar method.

A check is made whether the link is on the assigned path between the current network element pair in the current ECT set (Block 365). If the link is not on the path between the network element pair in the ECT set, then the process continues on to select the next relevant network element pair by checking whether any remain to be processed (Block 361). If the link is on the assigned path between the network pair in the current ECT set, then a check is made whether all of the I-SIDs assigned to the current ECT set that are common to both network elements have been processed (Block 367). If all of the I-SIDs for the network element pair have not been considered, then the next shared I-SID is selected (Block 369). The I-SIDs in common can be processed in any order, serially, in parallel or in any similar method. The bandwidth assigned to the I-SID (e.g., the CIR associated with the I-SID) is adjusted to reflect the potential multipoint aspects of the service before applying it to the link. This is accomplished in one embodiment by dividing the bandwidth by the number of attachment points for the I-SID minus one to determine approximate link utilization expected for that I-SID. This is added to any accumulated value for the link to continue an accumulation of the total link utilization value (Block 371).

When all of the I-SIDs shared by the network element pair have been processed, the process continues to select the network element pair (Block 361). Where all the ECTs for the link have been processed, a calculation of the link available bandwidth value can be made (Block 373). The link available bandwidth is calculated by subtracting the link utilization value from the link capacity. In some embodiments, the link capacity is the total physical capacity of a link, in other embodiments, the link capacity can be an allotted or provisioned capacity (e.g., an allot capacity for a traffic type or similar classification).

When all links have been processed and the associated link utilization values and link available bandwidth determined, then the process exits and returns to the load distribution process of FIG. 3A at block 305.

With the link available bandwidth calculated, the process returns to that described in relation to FIG. 3A. For subsequent generation of ECT sets, when a set of candidate paths has been established, path selection is initially performed by generating path identifiers using the available bandwidth values to form a path identifier for each path by sorting the link available values from lowest to highest, then concatenating them together, padding the identifiers for all members in the set of qualified paths to be of equal length by appending one or more maximum link availability values, and ranking them from lowest to highest to identify paths with the best maximum e2e bandwidth and if a single path is not thereby identified and selected, and finally taking the subset of paths with equal bandwidth availability, selecting the path with the lowest sum of metrics, and if a tie still exists applying the common algorithm to the remaining tied paths to produce a unique selection.

The all network element pairs process begins again by selecting a network element pair (Block 305) and determining a set of candidate paths between the node pairs (Block 307). This process includes analyzing the set of candidate highest bandwidth paths by constructing a path identifier for each candidate shortest path. The path ID can be constructed from the link available bandwidth values for each link in a candidate shortest path, which is then lexicographically sorted from lowest value to highest value and padded by appending a maximum bandwidth value to make all candidate shortest path identifiers the same length (i.e., having the same number of values (Block 309). For example, if there is a two-hop candidate path it may have a path ID of 5-10, where 5 and 10 are the available bandwidth for the two links it traverses. A second candidate path may have five hops with a path ID of 5-10-10-15-15. To make these path IDs of equal length the first path ID is padded to generation the path ID 5-10-MAX-MAX-MAX, where 'MAX' is a define maximum bandwidth value usually selected to ensure the algorithm will select shorter paths. The path available bandwidth values are sorted to represent the end to end (e2e) bandwidth availability of each path, with the minimum bandwidth link at the beginning of the path ID and the maximum bandwidth link at the end of the path ID. The path ID of each candidate shortest path is ranked by their constituent path available bandwidth values (Block 311). In the above example, the 5-10-MAX-MAX-MAX path ID would be ranked above the 5-10-10-15-15-15 path ID, because the first two positions are equal (5-10), but the third position differentiates the two where 'MAX' is greater than 10. In another embodiment, instead of padding with MAX values the ranking comparison can simply end in the comparison of paths during the ranking by selecting the shorter path of the set that had been equal to that point in the comparison.

This overall process set forth in FIG. 3A always produce a unique path choice. The result is independent of any direction of computing: This is achieved by sorting the link available bandwidth values prior to ranking and intermediate state properties. The path selection algorithm produces the same result independent of the order of computation. The reverse path also selects paths identically to the forward path so the order of operations of any intermediate path selection do not matter. The path selection can incrementally resolve ties such the intermediate state maintained as the Dijkstra algorithm expands can be minimized. This also can be expressed as any portion of the selected path is also congruent with the selected path.

A check is made to determine whether there is more than one highest ranked candidate path based on each path ID for a given network element pair (Block 317).

Where a uniquely highest ranked path ID exists it can be selected without further processing and the forwarding database can then be updated with this selected path (Block 318). When there is more than one equal path ID for a candidate highest bandwidth path (i.e., identical path IDs), then if one of the tied paths has a unique lowest metric it can be selection, else all paths with equal path ID and lowest metric are processed using the common algorithm tie-breaking process to perform path selection in this subset of highest ranked candidate paths (Block 321). The forwarding database is then updated to reflect the selected paths (Block 318).

In other embodiments, it is possible to use a schedule of variations of the common algorithm or another algorithm guaranteed to produce a unique result of the appropriate properties. For example, the 802.1aq algorithm defines 16 variations, and the secondary tie breaker for the second set could be algorithm variant 2 (algorithm ID 0x08c202), for the third set variant 3 (algorithm ID 0x08c203) or similar configuration.

A check is then made to determine whether all of the network element pairs have a selected shortest path or set of shortest paths (Block 319). If not, then the process continues by selecting the next network element pair to process (Block 323). If all of the node pairs have been processed, then a check is made to determine whether additional paths or ECT sets are needed (Block 325). If no additional paths or ECT sets are needed (this may be a parameter that is set by a network administrator or similarly determined, e.g., this parameter can be preconfigured and is common network wide, for at least 802.1aq, all nodes agree on the number of ECT sets and the algorithms as part of the hello handshake procedure), then the load distribution process ends. If additional paths or ECT sets are needed, then the process continues with a third pass or iteration that is similar to the second, but builds on the cumulative link bandwidth utilization determined in previous iterations. This process can have any number of iterations and is only limited by the particular networking technology in use (e.g. Ethernet would cap out at 4094 iterations since the process would exhaust the set of possible B-VIDs as ECT set IDs).

Figure 3C:
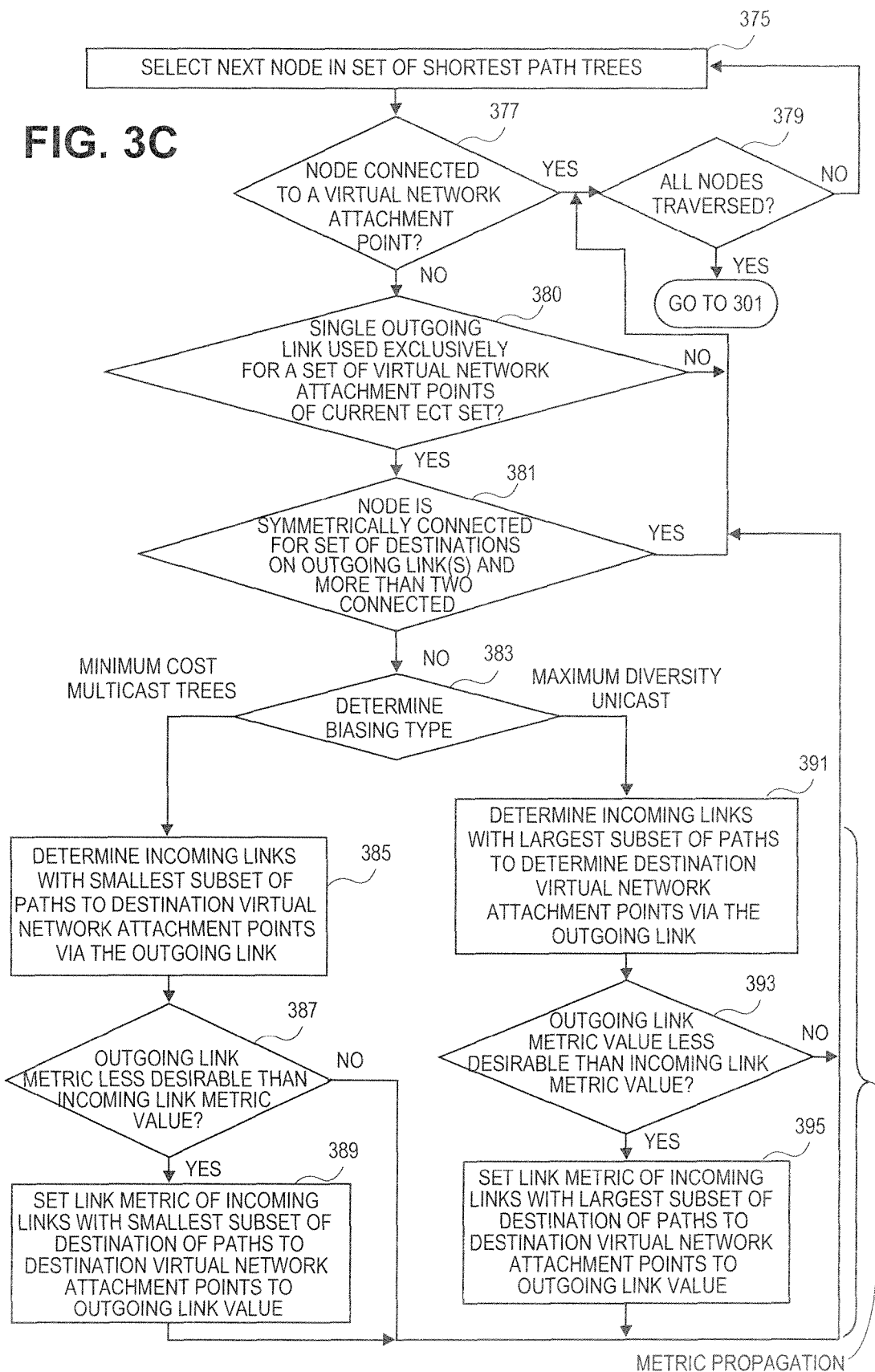

FIG. 3C is a diagram of one example implementation of the link metric biasing as applied to a load distribution process using link available bandwidth. The link metric biasing process can traverse the set of nodes in the generated shortest path trees to identify candidate nodes for metric propagation where a downstream metric is propagated to an upstream link at a given node to indicate that the necessary metric for path selection upstream is limited by the downstream metric. This example is specific to use in combination with the load distribution process of FIG. 3A, however, one skilled in the art would understand that the principles and techniques are applicable to other applications.

The example embodiment can traverse the set of nodes by selecting a next node to analyze (Block 375) and continues to analyze the nodes in the shortest path trees until all of the nodes have been traversed. The selected node is first checked to determine whether it is directly connected to a virtual network attachment point in this example a service attachment point (Block 377). Such nodes are not candidates for metric propagation, because they are directly connected to the service attachment point, which does not benefit from metric biasing information or biasing. If the node is directly connected to the service attachment point, then the node analysis has completed for this node and a check can be made whether there are additional nodes to be analyzed (Block 379), in which case the process continues to the select the next node (Block 375). If there are no further nodes then the process has completed and the process returns to the load distribution process at Block 301.

If the node does not have any virtual network attachment points for the current ECT set, then a check is made whether the node has a single outgoing link that is used exclusively to reach a set of virtual network attachment points that are associated with the current ECT set (Block 380). If the node meets this criteria it can be considered a 'candidate node.' If the node is not a candidate node, then the process can continue by checking if further nodes remain to be processed (Block 379). If a candidate node has been identified, then it can be checked whether it is symmetrically connected (i.e., 2-connected) for a set of destinations on the outgoing links of the node (Block 381). If the node is symmetrically connected, then the metric propagation is inapplicable as each subset of destinations is equal and the process continues on to check if there are additional nodes to be examined (Block 379) and if so selects the next node (Block 375).

Where the incoming subsets of paths to the virtual network attachment points that is exclusively reachable though the outgoing link is not symmetrical, then a check is made to determine the type of link metric biasing is to be applied (Block 383). Specifically, whether the process is configured to bias the generation of equal cost trees toward minimum cost multicast trees or toward maximum diversity unicast trees. If the process is configured for biasing toward minimum cost multicast trees, then the process determines a set of incoming links with a smallest subset of paths to the destination virtual network attachment points via an outgoing link (Block 385). A comparison is made of the link metric of the identified incoming links with the outgoing link metric value (i.e., in this example embodiment, the link available bandwidth value) (Block 387). If the outgoing link have a less desirable metric value than the incoming link, then the link metric value of the incoming links with the smallest subset of paths to the destination virtual network attachment points is set to the outgoing link metric value (i.e., the determined incoming link metric value is set to be equal to the outgoing link metric value) (Block 389). The outgoing link value discussed herein is the unbiased outgoing link value, not an outgoing link value that has been biased by link metric propagation.

Similarly, if the process is configured for biasing toward maximum diversity unicast trees, then the process determines a set of incoming links with a largest subset of paths the destination virtual network attachment points s for an outgoing link (Block 391). A comparison is made of the link metric of the identified incoming links with the outgoing link metric value (i.e., in this example embodiment, the link available bandwidth value) (Block 393). If the outgoing link has a lower metric value than the identified incoming links, then the link metric value of the incoming links with the largest subset of destinations is set to the outgoing link metric value (i.e., the identified incoming link metric value is set to be equal to the outgoing link metric value) (Block 395). The outgoing link value discussed herein is the unbiased outgoing link value, not an outgoing link value that has been biased by link metric propagation.

Figure 4:
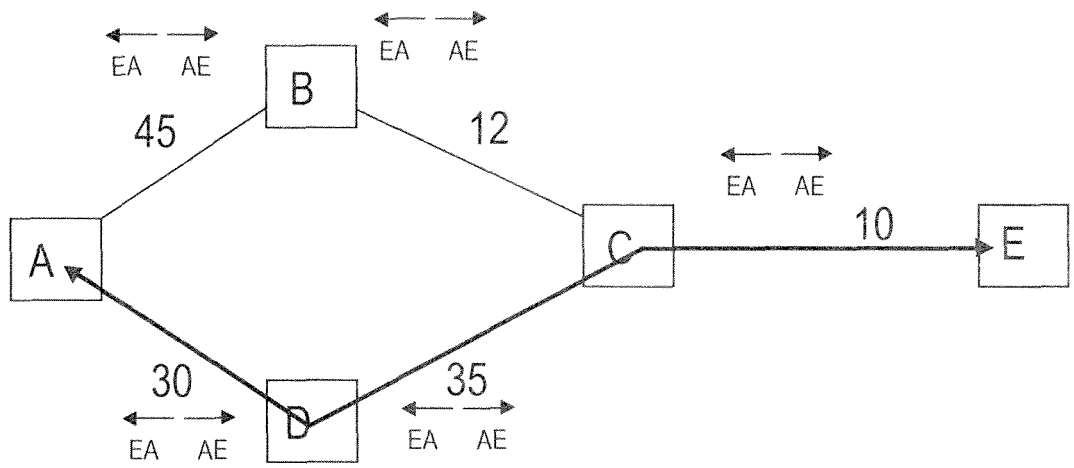
FIG. 4 is a diagram of an example of a simple symmetrical network topology with two sources of load.

FIG. 4 is a diagram of an example of a simple symmetrical network topology with two sources of load. In this example, there are two sources of load attached to nodes A and E respectively. The dark arrow path is determined from a load distribution process. In such a process two possible shortest paths between A and E are determined, namely ABCE and ADCE. The nodes of these paths can be examined by the link metric biasing process. Nodes B and D are two connected, i.e., they have a single incoming and outgoing links or the paths that traverse them, so no link metric biasing modification would be performed for these nodes. Node C is multiply connected, but the subsets of the destinations on its links are equal in size. Considering link CE as an outgoing link there are equal (shared) destinations for the traversing paths. For CD and BC being considered as outputs, the node is two connected, that is there is a single incoming link and outgoing link for a single traversing path. Thus, no link metric modification would be performed before path selection in a load distribution process.

Figure 5:
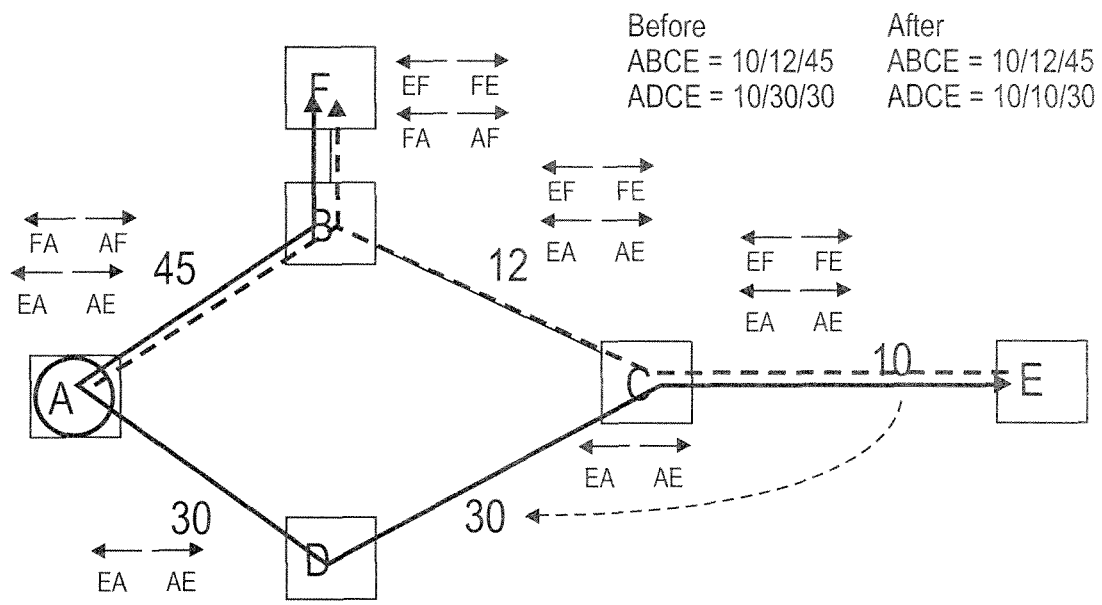
FIG. 5 is a diagram of another example of a simple asymmetrical network topology with three sources of load.

FIG. 5 is a diagram of another example of a simple asymmetrical network topology with three sources of load. This example builds on the preceding example, but adds a third node, F, with a virtual network attachment point in common with the attachment points on A and E to the topology. In this scenario, there is a break from the symmetry of the preceding example. When examining the node C, there is an asymmetry of the subset of destinations on each outgoing link BC and DC. If link metrics are not biased, then the ECT computation would produce the tree routed at node A shown as a solid line traversing the nodes, because it produces the largest available bandwidth metrics in the path selection process. This ECT has a total of 5 multicast hops. However, if link metric biasing was enabled to encourage minimum cost multicast trees, then incoming link metric for node C (in this case link CE), which is the link available bandwidth value of 10 would be propagated to the incoming link BC being the link with the smallest subset of destinations associated with it. This changes the link metrics for the paths between nodes A and E to the illustrated before and after values depicted in FIG. 5.

Considering this topology and possible link metric biasing in examining node B, the evaluation of node B does not result in any link metric biasing. The paths transiting node B over links AB and BC are not subsets of BF and the paths are not supported by the link BF.

Figure 6:
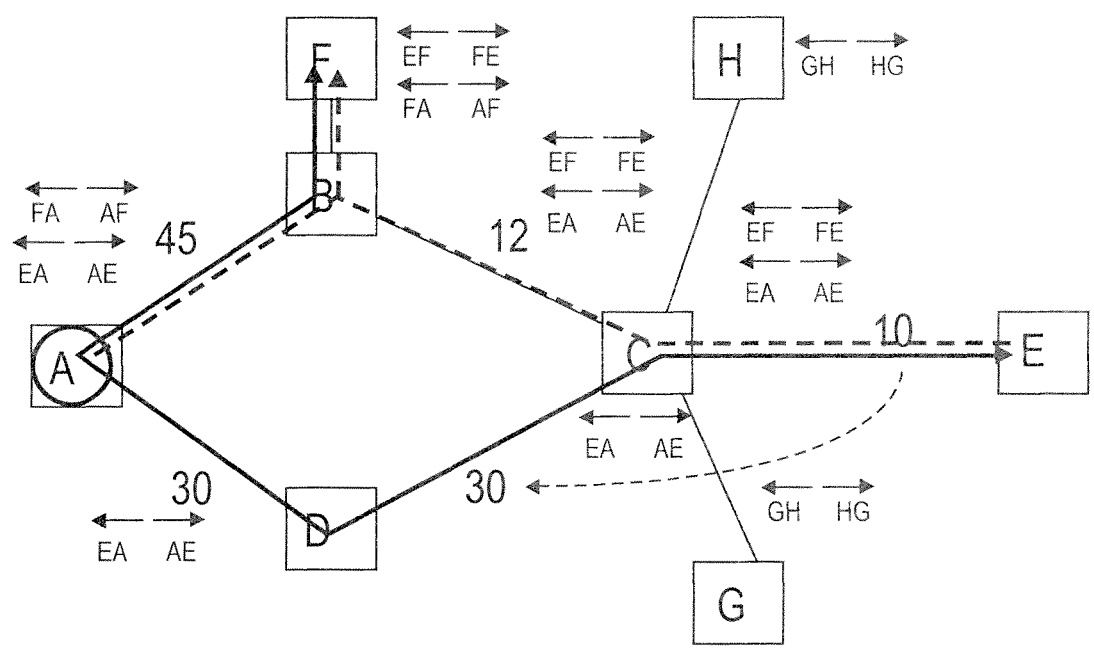
FIG. 6 is a diagram of a further more complicated example embodiment applying the link metric biasing to an example topology.

FIG. 6 is a diagram of a further more complicated example embodiment applying the link metric biasing to an example topology. Additional nodes H and G are added to the topology. However, these nodes do not have any virtual network attachment points in common with nodes A, E and F. Thus, the sets of shortest paths that are generated do not include these nodes and the links connecting to them. Thus, the shortest paths traversing links CE, CB and CD are unchanged by the addition of these nodes to the network topology and the metric propagation process is unchanged and proceeds as described herein above in the preceding examples.

Variations and Alternate Embodiments

In the described embodiments herein above, when a metric propagation is considered the outgoing link metric value is propagated to an incoming link metric. However, it is possible that other modifications or biasing values are utilized in place of the outgoing link metric. For example, the average of outgoing and incoming link values could be utilized. Absolute values could also be utilized in some circumstances, by biasing a link to a zero value or a very large value.

Thus, a method, system and apparatus for link metric biasing in a network have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a network element for modifying the characteristics of tree construction for use in virtual network connectivity in a network that includes the network element, a virtual network is associated with a set of virtual network attachment points that are mapped to network elements in a topology of the network where the virtual network is individually associated with an equal cost tree (ECT) set, the method to generate individual ECT sets to interconnect sets of virtual network attachment points for connectivity establishment and maintenance of the connectivity in the network, the method to modify link metrics across the topology of the network to be used for computing an ECT set to bias a tie-breaking process for selecting between equal cost paths toward either producing minimal cost shortest path multicast trees or maximizing unicast path diversity in the multiple ECT sets that are generated, the method comprising the steps of:
   selecting the virtual network that requires connectivity in the network;
   computing shortest path trees to interconnect the set of virtual network attachment points for the virtual network without resolving ties between the shortest path trees;
   determining which nodes of the shortest path trees for the virtual network are candidate nodes for metric biasing using metric propagation;
   implementing metric biasing using metric propagation based on biasing configuration; and
   tie-breaking all multi-path possibilities in the shortest path trees to produce the set of ECTs for the virtual network and the set of virtual network attachment points.

2. The method of claim 1, further comprising the step of:
   computing an initial set of ECTs based on the network topology for another virtual network and another set of virtual network attachment points.

3. The method of claim 2, wherein computing the initial set of ECTs based on the network topology for an aggregate of a set of virtual network attachment points that each require connectivity.

4. The method of claim 1, wherein determining which nodes are candidate nodes further comprising the step of:
   identifying candidate nodes that do not have virtual network attachment points in a current set of virtual networks and have a single outgoing link used exclusively to reach at least one virtual network attachment point.

5. The method of claim 4, wherein determining which nodes are candidate nodes further comprises the step of:
   identifying the candidate nodes where there are incoming links with asymmetrical subsets of paths to virtual network attachment points exclusively reachable by the outgoing link amongst the shortest path trees.

6. The method of claim 1, wherein implementing metric biasing further comprises the step of:
   setting an incoming link metric to an outgoing link metric for an incoming link having a smallest subset of paths to destination virtual network attachment points via the outgoing link, where the outgoing link metric is less desirable than the incoming link metric, wherein the setting biases the tie-breaking for the ECT set towards minimum cost multicast trees.

7. The method of claim 1, wherein implementing metric biasing further comprises the step of:
   setting an incoming link metric to an outgoing link metric for an incoming link having a largest subset of paths to destination virtual network attachment points via the outgoing link, where the outgoing link metric is less desirable than the incoming link metric, wherein the setting biases the tie-breaking of equal cost paths in the ECT set towards maximum unicast diversity.

8. The method of claim 1, wherein the link metric is the available link bandwidth defined as the net remaining bandwidth after all previous ECT placement has occurred.

9. The method of claim 1 wherein the virtual network is one of a set of virtual networks associated with a single aggregated tree set.

10. The method of claim 1, where the network element is in a distributed routing system that applies the method as an individual step in a particular computation order used to converge the network.

11. The method of claim 1, wherein an initial tie-breaker of the path selection process is a sum of link metrics.

12. A network element for implementing a method of modifying the characteristics of tree construction for use in virtual network connectivity in a network that includes the network element, a virtual network is associated with a set of virtual network attachment points that are mapped to network elements in a topology of the network where the virtual network is individually associated with an equal cost tree (ECT) set, the method to generate individual ECT sets to interconnect sets of virtual network attachment points for connectivity establishment and maintenance of the connectivity in the network, the method to modify link metrics across the topology of the network to be used for computing an ECT set to bias a tie-breaking process for selecting between equal cost paths toward either producing minimal cost shortest path multicast trees or maximizing unicast path diversity in the multiple ECT sets that are generated, the network element comprising:
   a database to store the topology of the network; and
   a processor communicatively coupled to the database, the processor configured to execute a metric biasing module, the metric biasing module configured to compute shortest path trees to interconnect the set of virtual network attachment points for the virtual network without resolving ties between the shortest path trees, to determine which nodes of the shortest path trees for the virtual network are candidate nodes for metric biasing using metric propagation, to implement metric biasing using metric propagation based on biasing configuration, and to tie-break all multi-path possibilities in the shortest path trees to produce the set of ECTs for the service and the set of virtual network attachment points.

13. The network element of claim 12, wherein the metric biasing module is further configured to compute an initial set of ECTs based on the network topology for another virtual network and another set of virtual network attachment points.

14. The network element of claim 13, wherein computing the initial set of ECTs based on the network topology is for an aggregate of a set of virtual network attachment points that each require connectivity.

15. The network element of claim 12, wherein the metric biasing module is further configured to identify candidate nodes that do not have virtual network attachment points in a current set of virtual networks and have a single outgoing link used exclusively to reach at least on virtual network attachment point.

16. The network element of claim 15, wherein the metric biasing module is further configured to identify the candidate nodes where there are incoming links with asymmetrical subsets of paths to virtual network attachment points exclusively reachable by the outgoing link amongst the shortest path trees.

17. The network element of claim 12, wherein the metric biasing module is further configured to set an incoming link metric to an outgoing link metric for an incoming link having a smallest subset of paths to destination virtual network attachment points via the outgoing link, where the outgoing link metric is less desirable than the incoming link metric, wherein the setting biases the tie-breaking for the ECT set towards minimum cost multicast trees.

18. The network element of claim 12, wherein the metric biasing module is further configured to set an incoming link metric to an outgoing link metric for an incoming link having a largest subset of paths to destination virtual network attachment points via the outgoing link, where the outgoing link metric is less desirable than the incoming link metric, wherein the setting biases the tie-breaking of equal cost paths in the ECT set towards maximum unicast diversity.

19. The network element of claim 12, wherein the link metric is the available link bandwidth defined as the net remaining bandwidth after all previous ECT placement has occurred.

20. The network element of claim 12, wherein the virtual network is one of a set of virtual networks associated with a single aggregated tree set.

21. The network element of claim 12, where the network element is in a distributed routing system that applies the method as an individual step in a particular computation order used to converge the network.

22. The network element of claim 12, wherein an initial tiebreaker of the path selection process is a sum of link metrics.

* * * * *

UNITED STATES PATENT AND TRADEMARK OFFICE
CERTIFICATE OF CORRECTION

| | | |
|---|---|---|
| PATENT NO. | : 9,160,651 B2 | Page 1 of 1 |
| APPLICATION NO. | : 14/101235 | |
| DATED | : October 13, 2015 | |
| INVENTOR(S) | : Allan | |

It is certified that error appears in the above-identified patent and that said Letters Patent is hereby corrected as shown below:

In the Drawings

In Fig. 2A, Sheet 2 of 8, delete Tag "105", and insert Tag -- 205 --, therefor.

In the Specification

In Column 1, Line 8, delete "2013," and insert -- 2013, now abandoned; --, therefor.

In Column 4, Line 19, delete "and" and insert -- and/or --, therefor.

In the Claims

In Column 22, Line 21, in Claim 10, delete "where" and insert -- wherein --, therefor.

Signed and Sealed this
Fifteenth Day of March, 2016

Michelle K. Lee
*Director of the United States Patent and Trademark Office*